(12) United States Patent
Eversole et al.

(10) Patent No.: US 6,704,432 B2
(45) Date of Patent: Mar. 9, 2004

(54) EXTENSIBLE FILE FORMAT

(75) Inventors: Adam Clyde Eversole, Redmond, WA (US); Benjamin Eric Ross, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 172 days.

(21) Appl. No.: 09/982,764

(22) Filed: Oct. 18, 2001

(65) Prior Publication Data

US 2003/0076978 A1 Apr. 24, 2003

(51) Int. Cl.[7] .................................................. G06K 9/00
(52) U.S. Cl. .................................. 382/100; 713/176
(58) Field of Search ................................ 382/100, 112, 382/218, 219, 305, 366; 358/328, 403, 405; 380/54, 202, 210; 705/67; 713/176

(56) References Cited

U.S. PATENT DOCUMENTS

| 5,133,051 | A | 7/1992 | Handley ..................... 715/514 |
| 5,367,698 | A | 11/1994 | Webber et al. ............... 709/203 |
| 5,530,759 | A | 6/1996 | Braudaway et al. .......... 380/54 |
| 5,878,434 | A | 3/1999 | Draper et al. ................ 707/202 |
| 5,881,287 | A | 3/1999 | Mast .......................... 717/127 |
| 5,917,912 | A | 6/1999 | Ginter et al. ................ 713/187 |
| 5,933,842 | A | 8/1999 | Ross .......................... 707/514 |
| 5,946,696 | A | 8/1999 | Young ......................... 707/104 |
| 5,974,548 | A | 10/1999 | Adams ........................ 713/200 |
| 5,991,771 | A | 11/1999 | Falls et al. .................. 707/202 |
| 6,044,155 | A | 3/2000 | Thomlinson et al. ........ 713/155 |
| 6,071,317 | A | 6/2000 | Nagel ......................... 717/128 |
| 6,122,403 | A | * 9/2000 | Rhoads ....................... 382/233 |

OTHER PUBLICATIONS

PCT International Search Report for PCT/US02/33145.

* cited by examiner

Primary Examiner—Jayanti K. Patel
(74) Attorney, Agent, or Firm—King & Spalding LLP

(57) ABSTRACT

The present invention can provide an extensible file format compatible with previous, current, and future versions of an application program. The present invention can comprise including file version watermarks in an original data file of an application program. The file version watermarks can indicate various properties of the original data file. The file version watermarks can include a high version watermark, a last version watermark, a low version watermark, a creation version watermark, and an object version watermark. Each file version watermark can indicate changes, additions, or deletions made to the file. The present invention can use the file version watermarks to determine whether the file, or particular information in the file, corresponds to the previous, active, or future versions of an application program. Accordingly, the present invention can then load or save the original data file based on a result of the determination.

61 Claims, 8 Drawing Sheets

300 → 302 304 306

| Name | Type | value |
|---|---|---|
| 11 bits | 5 bits | variable |
| 1 | Short Integer (2 bytes) color | 0x00FF0000 red |
| 2 | Short Integer (2 bytes) border | 0x00000001 solid |

Conventional Art
Figure 3

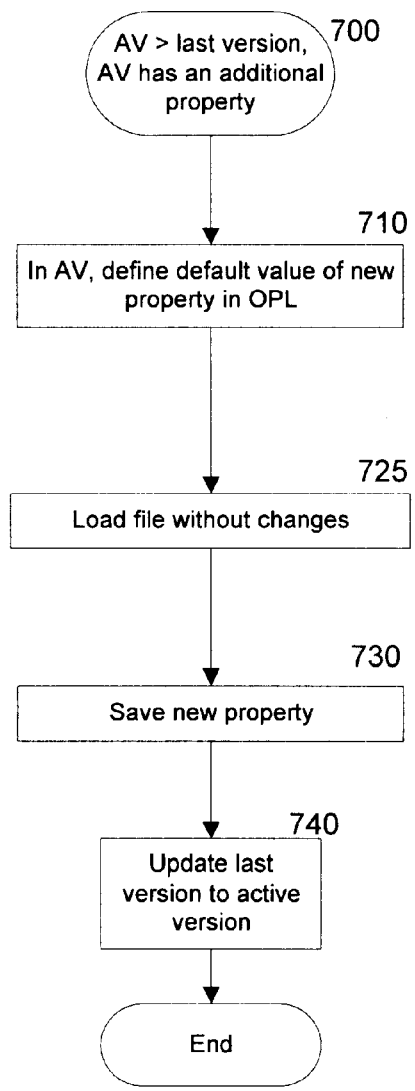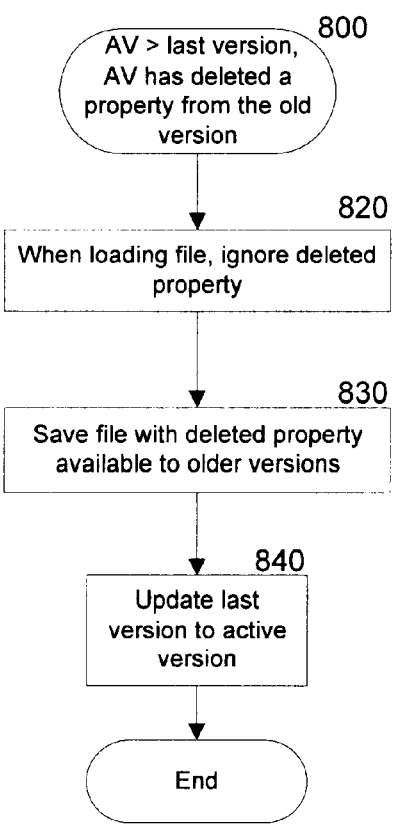
Figure 7                    Figure 8

EXTENSIBLE FILE FORMAT

TECHNICAL FIELD

The present invention relates generally to computer systems and programs. More particularly, the present invention relates to a system and method that can provide a file format compatible with previous, active, and future versions of an application program.

BACKGROUND OF THE INVENTION

Computer application programs are generally used to perform many computer processing tasks. An application program can be used to create and modify a data file, which stores information of a particular item for the application program. For example, a document can be created using a desktop publishing type application program. The document can contain many individual elements, such has headers, text, graphics, styles, fonts, etc. The publishing type application program can be used to create a data file that stores all of the information of that particular document.

Every application program that saves files on a computer system must determine what format in which to save data. There are many ways of saving data, ranging from saving out memory images of data to writing out data in an industry standard form. Additionally, computer application programs are continually being updated and changed to provide the latest features and technology available. The updates and changes are typically provided to end users by releasing an updated version of the application program. The file format used by the updated version of the application program needs to be compatible with previous and future versions. However, the updated version typically uses a different file format than previous versions, because new features in the updated version require new data to be written to the data file. Problems can arise between two different versions of the application program, because the different file format can prevent previous versions from being able to read the updated version's files.

An "object," as used in this disclosure, refers to an entity that has characteristics and that is displayed by an application program, is part of an application program, or is part of the data stored/manipulated by the program. An example of an object displayed by an application program is a text box contained in a window of an application program into which a user can input text. The characteristics of the text box can include its color, the font of the text, and the point size of the text. An example of an object that is part of an application program is an in-memory representation of an animal, where its characteristics can include its color, number of legs, and whether it is a carnivore. This in-memory representation can be implemented as a data structure with the elements of the data structure storing the characteristics. An example of such a data structure is the C++ class data structure. The characteristics of an object are referred to as properties of the object. Each property of an object typically has a value. For example, the color property may have the value red.

An example of an object 100 is illustrated in FIG. 1. Object 100 can comprise a border 102 and text 104. Object 100 can have six properties for border 102 and text 104. Border 102 can have properties of border style and border size. Text 104 can have properties of font, text size, justification, and text style. The default values for border 102 and text 104 can be that the border style is solid, the border size is 4 point, the text font is Times New Roman, the text size is 20 point, the text justification is left, and the text style is non-italic.

In an application program, the default values of the objects and properties can be established during initial programming. During operation of the program, the default values can be changed and stored in the data file. For example, in a draw program that can display objects such as rectangles and triangles, a user can modify the objects' properties. Returning to the example of FIG. 1, the properties of object 100 can be changed such that the solid border becomes a dashed border and the text style becomes italic. Later versions of the program can typically read the default values and the changes for each object. However, when later versions of the program are created, the file format typically differs from that of the previous version. Accordingly, the previous version cannot read files from the later version. Using the above example from the previous paragraph, a later version could include a new feature such as a shadow for object 100. The added feature requires new data to be written to the program's files, thereby changing its format. The previous version cannot read the files of the later version containing the new data, because the file formats are different.

One conventional solution to the problem discussed above is to limit the new features of the updated version so that the file format remains compatible with previous versions. However, that solution can prevent the best product from being distributed to the user and can limit the overall function and performance of the program.

Another conventional solution to the problem discussed above is to create an adapter program that converts the old file from the previous version to a new file compatible with the updated version. The adapter program also can convert a new file to a file compatible with the previous version. However, that solution can be inconvenient for the user and can require a large amount of memory and processing time to convert the files. Furthermore, that solution can cause the user to lose important information needed by the newer version of the program when the file is saved by a previous version.

Therefore, there is a need in the art for an improved system and method that can provide a file format compatible with previous, current, and later versions of an application program. There is also a need in the art for an extensible file format that can allow new features to be added in future versions of an application program while remaining compatible with previous versions.

SUMMARY OF THE INVENTION

The present invention relates generally to a system and method for providing an extensible file format that can be compatible with previous, current, and future versions of an application program. The present invention is directed to an extensible file format that supports the addition of new features to future versions of the application program, while maintaining compatibility (without modification) with previous and/or current versions. Accordingly, the present invention can enable a software vendor to provide multiple version compatibility with the same files without limiting the features that can be added to future versions.

In one exemplary aspect, the present invention can comprise including file version watermarks in an original data file of an application program. The file version watermarks can be an element in the original data file that can indicate various properties of the original data file. For example, a high version watermark can be provided in the original data file to indicate the highest version of the application program used to save the file. A last version watermark can be provided in the original data file to indicate the last version of the application program used to save the file. A low version watermark can be provided in the original data file to indicate the lowest version of the application program used to save the file. A creation version watermark can be provided in the original data file to indicate the version of the application program that first created the file. An object version watermark can be provided in the original data file to indicate the highest version of the application program to write a particular object. Each file version watermark can indicate changes, additions, or deletions made to the file.

In another exemplary aspect, the present invention can comprise determining how to load or save the original data file based on the information provided in one or more file version watermarks. In one exemplary aspect, the present invention can determine whether the high version watermark in the file represents a newer version than the active version of the application program that is loading or saving the file. The high version watermark represents a newer version if the original data file has been saved by a newer version of the application program with respect to the active version. In that case, the present invention can determine whether the original data file contains information that is unknown to the active version. The unknown information can then be ignored by the active version of the application program and retained for use by newer (later) versions.

In another exemplary aspect, the present invention can determine whether the high version watermark in the file represents an older version than the active version of the application program that is loading or saving the file. The high version watermark represents an older version than the active version if the original data file has been saved by an older version of the application program with respect to the active version. In that case, the present invention can determine whether the active version contains new information that is based on old information in the original data file. The new information can then be updated based on the old information. Additionally, the new information can be saved for use by older (previous), active, and newer (later) versions by storing data in the format of the older version, as well as in the format of the active and newer versions.

According to another exemplary aspect of the present invention, the in-memory structure of the application program can be separated from the data file format. Accordingly, future versions of the application program can include many new features without changing the data file format. For example, structures can be moved around in memory to be more efficient for a certain processor type without being incompatible with a different version because of differing data file formats.

The present invention also can minimize the amount of memory and processing needed for loading and saving data files corresponding to different versions of an application program. The file version watermarks can identify particular information in a data file that corresponds to a different version. Accordingly, any processing or conversion can be performed on only the identified information.

Another exemplary aspect of the present invention incorporates an object property list ("OPL") or an object property list array ("OPL array") as the data file structure. An OPL or OPL array can allow "round-tripping" of unknown property data from future versions by propagating or returning the unknown data back to the saved data file. The OPL or OPL array can be loaded into memory. All of its properties that are known by a particular version of the application program can be overwritten as needed. The remaining properties (i.e., properties that are unknown to the particular version) were created by a newer version and can remain in the file untouched. For each memory structure saved in a data file, there can be an associated OPL or OPL array for saving that structure.

These and other aspects, objects, and features of the present invention will become apparent from the following detailed description of the preferred embodiments, read in conjunction with, and reference to, the accompanying drawings.

BRIEF DESCRIPTION OF THE DRAWINGS

FIG. 3 is a block diagram illustrating characteristics of a conventional OPL;

FIG. 7 is a flow chart depicting a method for loading and saving an original data file according to the present invention, where the active version has an additional object property that is not included in a previous version;

FIG. 8 is a flow chart depicting a method for loading and saving an original data file according to the present invention, where the active version has deleted an object property that was used in a previous version.

DETAILED DESCRIPTION OF THE INVENTION

Figure 1:
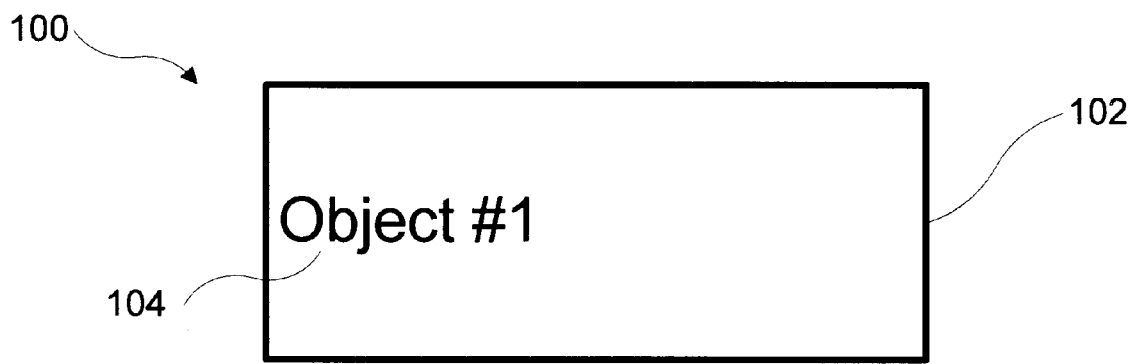
FIG. 1 is a block diagram illustrating an object used by an application program.

The present invention will be described in detail with reference to the accompanying drawings, in which like reference numerals represent like elements.

The present invention can provide an extensible file format compatible with previous, current, and future versions of an application program. The present invention can comprise including file version watermarks in an original data file of an application program. The file version watermarks can indicate various properties of the original data file. The file version watermarks can include a high version watermark, a last version watermark, a low version watermark, a creation version watermark, and an object version watermark. Each file version watermark can indicate changes, additions, or deletions made to the file. Each of the file version watermarks can also be provided for particular information in the file, such as for a particular object in the file, to indicate the versions that modified the particular information. The present invention can use the file version watermarks to determine whether the file, or particular information in the file, corresponds to the previous, active, or future versions of an application program. Accordingly, the present invention can then load or save the original data file based on a result of the determination.

Figure 2:
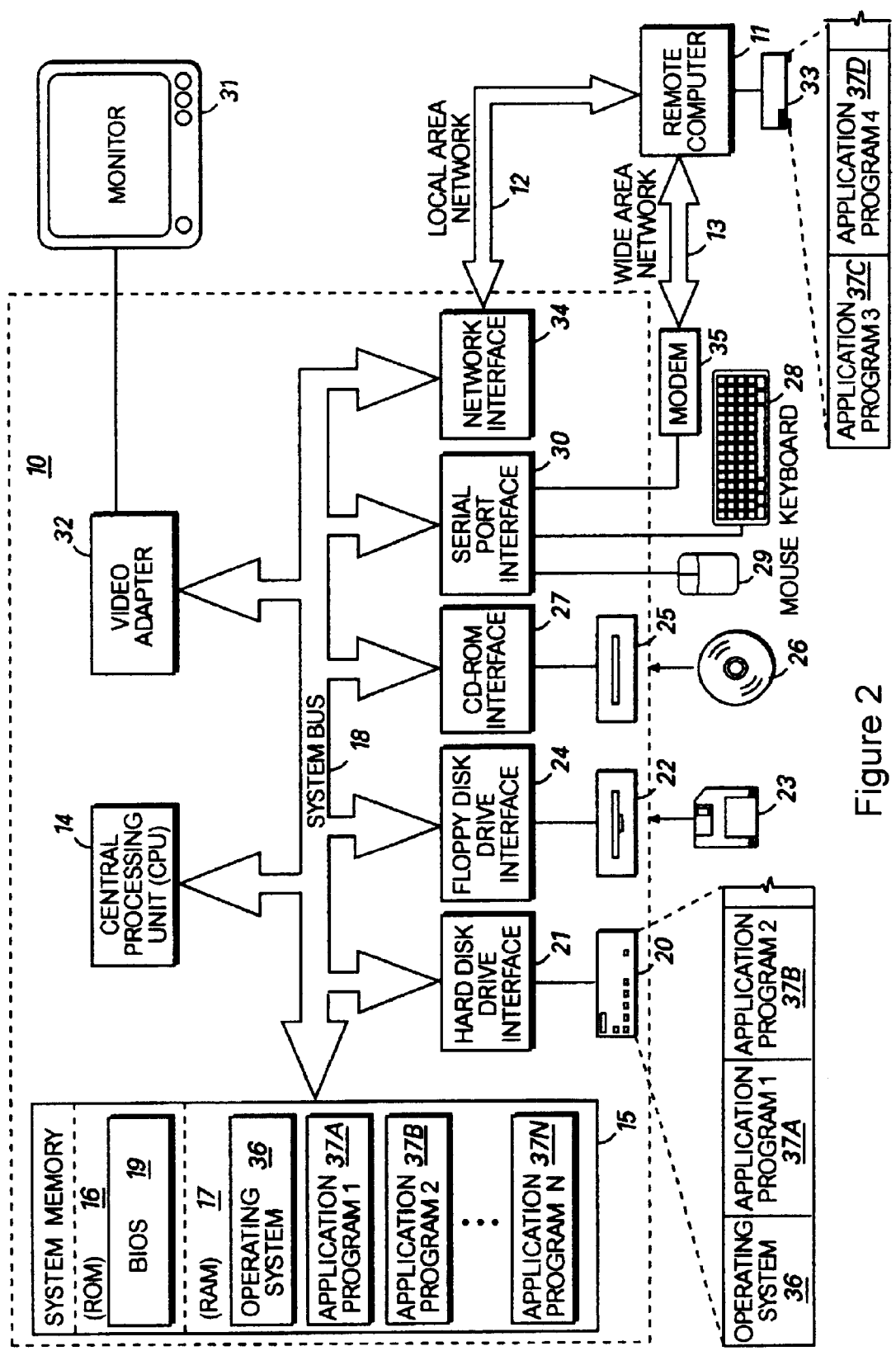
FIG. 2 is a block diagram illustrating an exemplary computer suitable for practicing an exemplary embodiment of the present invention.

FIG. 2 illustrates various aspects of an exemplary computing environment in which the present invention is designed to operate. Those skilled in the art will appreciate that FIG. 2 and the associated discussion are intended to provide a brief, general description of the preferred computer hardware and program modules, and that additional information is readily available in the appropriate programming manuals, user's guides, and similar publications.

FIG. 2 illustrates a conventional personal computer 10 suitable for supporting the operation of the preferred embodiment of the present invention. As shown in FIG. 2, personal computer 10 operates in a networked environment with logical connections to a remote server 11. The logical connections between personal computer 10 and remote server 11 are represented by a local area network 12 and a wide area network 13. Those of ordinary skill in the art will recognize that in this client/server configuration, remote server 11 may function as a file server or computer server.

Personal computer 10 includes a processing unit 14, such as "PENTIUM" microprocessors manufactured by Intel Corporation of Santa Clara, Calif. Personal computer 10 also includes system memory 15, including read only memory (ROM) 16 and random access memory (RAM) 17, which is connected to the processor 14 by a system bus 18. The preferred computer 10 utilizes a BIOS 19, which is stored in ROM 16. Those skilled in the art will recognize that BIOS 19 is a set of basic routines that helps to transfer information between elements within personal computer 10. Those skilled in the art will also appreciate that the present invention may be implemented on computers having other architectures, such as computers that do not use a BIOS, and those that utilize other microprocessors.

Within personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into personal computer 10 by using input devices, such as a keyboard 28 and/or pointing device, such as a mouse 29, which are connected to the system bus 18 via a serial port interface 30. Other types of pointing devices (not shown in FIG. 2) include track pads, track balls, pens, head trackers, data gloves, and other devices suitable for positioning a cursor on a computer monitor 31. The monitor 31 or other kind of display device is connected to the system bus 18 via a video adapter 32.

Remote server 11 in this networked environment is connected to a remote memory storage device 33. Remote memory storage device 33 is typically a large capacity device such as a hard disk drive, CD-ROM or DVD drive, magneto-optical drive or the like. Those skilled in the art will understand that program modules, such as application program modules 37C and 37D, are provided to remote server 11 via computer-readable media. Personal computer 10 is connected to remote server 11 by a network interface 34, which is used to communicate over the local area network 12.

In an alternative embodiment, personal computer 10 is also connected to remote server 11 by a modem 35, which is used to communicate over the wide area network 13, such as the Internet. Modem 35 is connected to system bus 18 via serial port interface 30. Modem 35 also can be connected to the public switched telephone network (PSTN) or community antenna television (CATV) network. Although illustrated in FIG. 2 as external to personal computer 10, those of ordinary skill in the art can recognize that modem 35 may also be internal to personal computer 10, thus communicating directly via system bus 18. It is important to note that connection to remote server 11 via both local area network 12 and wide area network 13 is not required, but merely illustrates alternative methods of providing a communication path between personal computer 10 and remote server 11.

Although other internal components of personal computer 10 are not shown, those of ordinary skill in the art will appreciate that such components and the interconnection between them are well known. Accordingly, additional details concerning the internal construction of personal computer 10 need not be disclosed in connection with the present invention.

Those skilled in the art will understand that program modules, such as an operating system 36, an application program module 37A, a browser program module 37B, other program modules 37N, and data are provided to personal computer 10 via computer-readable media. In the preferred computer 10, the computer-readable media include the local or remote memory storage devices, which may include the local hard disk drive 20, floppy disk 23, CD-ROM or DVD 26, RAM 17, ROM 16, and the remote memory storage device 33. In preferred personal computer 10, local hard disk drive 20 is used to store data and programs.

Program modules 37N can contain application programs that can have files of the extensible file format according to an exemplary embodiment of the present invention. A first application program can manage an object which in turn can contain an object property list (OPL) of the extensible file format. The OPL can be stored in a contiguous block of system memory 16. A second application program can access the OPL of the object and can perform various functions using the OPL, as will be described below.

OPLs are a data structure for saving data in a data file. More detailed descriptions of OPLs can be found in U.S. Pat. Nos. 5,933,842 and 5,946,696. The disclosure of those patents is hereby incorporated by reference.

Conventional OPLs provide a data structure for a data file. That data structure enables the storing of information in a common format useful to provide compatibility with previous and future versions of an application program. The format of the OPL enables skipping over data that the application program does not recognize while using the data that the application program does recognize. Conventional OPLs can grow with new information in a new version of an application program because they can be dynamically expanded for new objects and properties.

Referring to FIG. 3, characteristics of a conventional OPL 300 will be described. (For additional information regarding OPLs, see U.S. Pat. Nos. 5,933,842 and 5,946,696.)

An "object," as used in this disclosure, refers to an entity that has characteristics and that is either displayed by an application program or is part of an application program. An example of an object displayed by an application program is a text box contained in a window of an application program into which a user can input text. The characteristics of the text box can include its color, the font of the text, and the point size of the text. An example of an object that is part of an application program is an in-memory representation of an animal, where its characteristics can include its color, number of legs, and whether it is a carnivore. This in-memory representation can be implemented as a data structure with the elements of the data structure storing the characteristics. An example of such a data structure is the C++ class data structure. The characteristics of an object are referred to as properties of the object. Each property of an object typically has a value. For example, the color property may have the value red.

As discussed in the Background section, an example of an object 100 is illustrated in FIG. 1. Object 100 can comprise a border 102 and text 104. Object 100 can have six properties for border 102 and text 104. Border 102 can have properties of border style and border size. Text 104 can have properties of font, text size, justification, and text style. The default values for border 102 and text 104 can be that the border style is solid, the border size is 4 point, the text font is Times New Roman, the text size is 20 point, the text justification is left, and the text style is non-italic.

Since OPL 300 uses a standard format, it can be used to internally store the properties of an object. For example, OPL 300 can include an object property identification ("opyid") element 302, an object property type element 304, and an object property value element 306. Opyid element 302 can contain a numerical identifier that is associated with a particular property. The system can maintain a mapping of all properties to their opyid, and this mapping can vary from OPL to OPL. In other words, each OPL can define what property the oypid values represent and other OPLs can use the same opyid values for different properties. Object property type element 304 refers to a data type, such as Short Integer (2 bytes), Long Integer (4 bytes), Unicode string, etc. Object property value element 306 conforms to the appropriate data type of the associated object property type element 304. As shown in FIG. 3 for example, opyid "1" denotes an object property type element 304 of Short Integer (2 bytes), which the system knows corresponds to a "color," and an object property value element 306 of 0x00FF0000, which is the RGB (Red, Green, Blue) encoding for "red." When referring to a particular property, the opyid is used. For example, if the border property in OPL 300 is desired, it is referenced by its opyid "2." An OPL may also contain another OPL as a property, allowing for more complex data structures to be created.

In a 16-bit conventional OPL, opyid element 302 is typically eleven bits. In such a configuration, OPL 300 is limited to 2048 items because of the eleven bit constraint. In a publishing system, the number of objects and properties can easily exceed 2048 items. A publishing document can have multiple pages, each having many objects. Each object can have many properties associated with it. Accordingly, maximizing OPL capacity in some instances is desirable. To this end, the present invention can include an improved OPL type, the OPL array, having an almost unlimited capacity. OPL arrays can store large amounts of data, such as all objects in a document. An OPL can still be used to store smaller quantities of properties.

Figure 4:
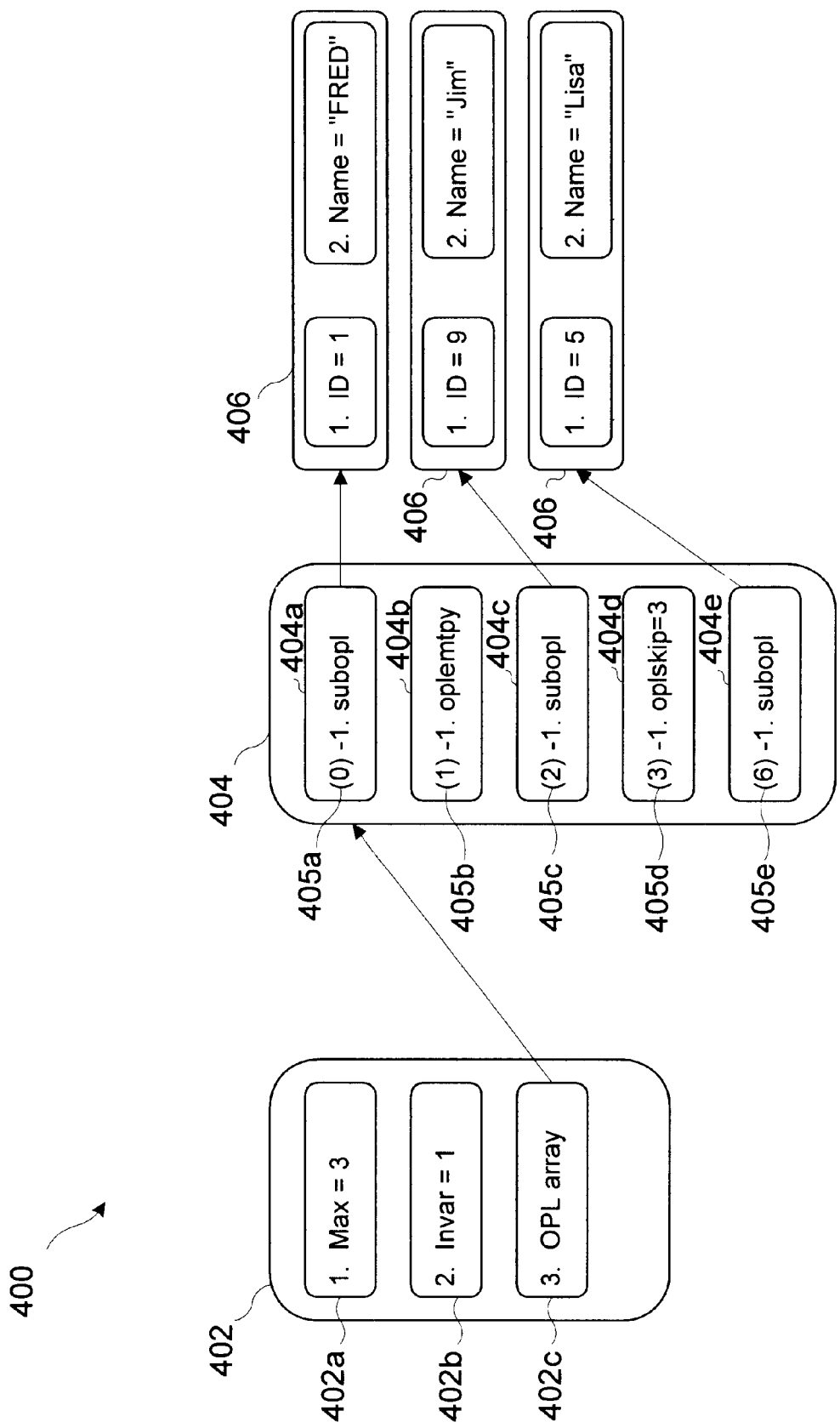
FIG. 4 is a block diagram illustrating characteristics of an OPL array according to an exemplary embodiment of the present invention.

Referring to FIG. 4, a Data structure 400 according to an exemplary embodiment of the present invention will be described. Data structure 400 can include root OPL 402. Root OPL 402 can include a "Max" property 402a, an invariant property 402b, and an OPL array property 402c. While not necessary, max property 402a can indicate the size of OPL array property 402c and can provide the convenience of allocating adequate memory when reading data structure 400. Invariant property 402b can define a feature where the array indices of items in OPL array property 402c remain constant. In other words, the array index of an item in OPL array property 402c will not change throughout the lifetime of the item. Accordingly, new items can only be added at an index that is not currently used, and deleting an item results in an empty index location.

OPL array property 402c can reference OPL array 404. OPL array 404 can be stored in OPL property 402c, or it can be stored separately. OPL array 404 can contain properties, other OPLs, or other OPL Arrays. As shown in FIG. 4, OPL array 404 can include a sub-object property list (a "subopl") 404a–404e, where each subopl 404a–404e can be a property, an OPL, or another OPL Array. Each subopl 404a–404e can reference an array element 406. Each array element 406 can be any property, an OPL, or another OPL Array. In the example, array elements 406 are OPLs that contain an ID and a variable length string.

While only one OPL array 404 is shown in FIG. 4, with its associated OPL array elements 406, the present invention is not limited to such a structure. For example, data structure 400 can include a plurality of OPLs like OPL array 404, each having associated OPL array elements 406. In that case, index 402c can reference each OPL array 404.

Subopls 404a–404e each reference a property, object, or other OPL similarly to opyid 302 (FIG. 3) of a conventional OPL. However, in data structure 400, the items in OPL array 404 are not given a specific opyid. Instead, the opyid for each subopl 404a–404e in OPL array 404 can be set to "−1." Then, the position of each subopl 404a–404e in OPL array 404 can be used as the opyid. The positions of each subopl 404a–404e are represented in FIG. 4 by respective index position indicators 405a–405e. For example, if a particular subopl such as that at position "2" in OPL array 404 is desired, the subopl 404c corresponding to the item at index position indicator 405c is provided. Subopl 404c is located at index position 2 in OPL array 404. Accordingly, Data structure 400 references specific OPLs based on their respective index position in OPL array 404. The index position of a particular subopl is its opyid. Data structure 400 eliminates the need to store a specific opyid for each element, thereby overcoming the deficiencies of the conventional OPL. In a typical 32 bit system, Data structure 400 can store more than four billion items, because the number of items is no longer limited by the range of the opyid. (Position indicators 405a–405e are for illustrative purposes and are not typically provided in OPL array 404.)

FIG. 4 also illustrates how empty slots in OPL array 404 can be saved for future reference. For the empty slot 404b at index position 405b, a placeholder property "oplempty" can indicate that the respective item at index position 405b is empty. Oplempty can indicate that a single array element is empty and should be skipped. For multiple adjacent empty array elements, a placeholder property of "oplskip=n" can be used. Oplskip=n can indicate that the next (n) entries are empty. As shown in FIG. 4 for example, item 404d corresponding to index position 405d, i.e., index positions "3–5," in OPL array 404 is filled by placeholder property "oplskip=3," indicating that the next 3 items in OPL array 404 are empty and should be skipped.

A data file can be characterized as a collection of objects. Each object can be defined by an OPL. Each OPL can have an object handle (OH) associated with it. The OH can be the index to the object OPL. Accordingly, the OH can identify an object and does not change over the life of the object. (See invariant field 402b of FIG. 4.) The structure of the file can be traversed by referencing the OH for each object, without having to use information specific to each object. An OH can remain unchanged (invariant) across file saves, making an OH useful to reference objects in memory and/or the file.

Ordinarily, an OH should be assigned to a single object and should not be reused if a later version of an application program has saved the file. For example, a tracking table could be introduced in the current version of the application program to track all objects created by the program. If a previous version loads the file and deletes one of the objects of the current version, then the tracking table of the current version will not be updated to reflect the changes. Additionally, if the OH for the deleted object is reused for a different object created in the previous version, then the tracking table of the current version will interpret the reused OH as a different object. By determining if a later version has saved the file, the present invention can avoid reusing an OH until doing so will not create problems. Then, when the later version loads the file, it can see all objects that have been deleted. The tracking table can then be adjusted accordingly. The present invention also can allow an OH to be reused, if the highest version that has ever used the file (determined by a file version watermark) saves the file. The present invention can allow the highest version to determine available OHs and make them available for reuse by removing all old references to objects which have been removed by previous versions.

To store a memory structure in an OPL or an OPL array, an "OPL dictionary" can be defined, which indicates the default values and types for each property. The number of dictionaries can be minimized because unused properties do not take up any space. Accordingly, one exemplary embodiment of the present invention can utilize a single dictionary. In such an embodiment, all common objects can have the same opyid or array index position for each identical item. In another exemplary embodiment, the following dictionaries can be provided: (1) a file structure dictionary, which can include all the file structure related properties (i.e., the root of the OPL tree); (2) a page object dictionary, which can include properties for all page objects of a publishing document; and (3) other structure dictionaries, which can include a dictionary for describing text containing objects with their associated text, or a color description dictionary for defining colors used in a publication, etc. When properties are defined in a dictionary, they can be referenced by any object. Accordingly, common properties used by common objects are the same, because they come from the same dictionary.

OPLs (and OPL arrays) can be advantageous for preserving, or "round-tripping," unknown properties or information from future versions. The original OPL can be loaded by a particular version from disk into memory. All of the OPL's properties that are known by the particular version can be overwritten. The remaining properties (i.e., properties that are unknown to the particular version) were created by a future version and can remain in the file untouched. Thus, the unknown properties can be propagated back to the saved file for use by a later version. The unknown properties can be ignored when loaded and easily retained when saved.

Using an OPL or OPL array as the memory structure can allow the in-memory structure to be separated from the file format. Accordingly, future versions of the application program can include many new features without problems associated with different file formats. For example, structures can be moved around in memory to be more efficient for a certain processor type without causing a change in file formats. For each memory structure saved in a file, there can be an associated OPL for saving that structure. The mapping from OPL to structure need not be one to one. The logical objects on disk can become separate memory structures for performance reasons. For example, hyperlink properties on an object might be stored in a reverse lookup table and used to determine what other objects are linked to any given object. Alternatively, multiple on-disk objects can be combined into a single structure in memory.

Figure 5:
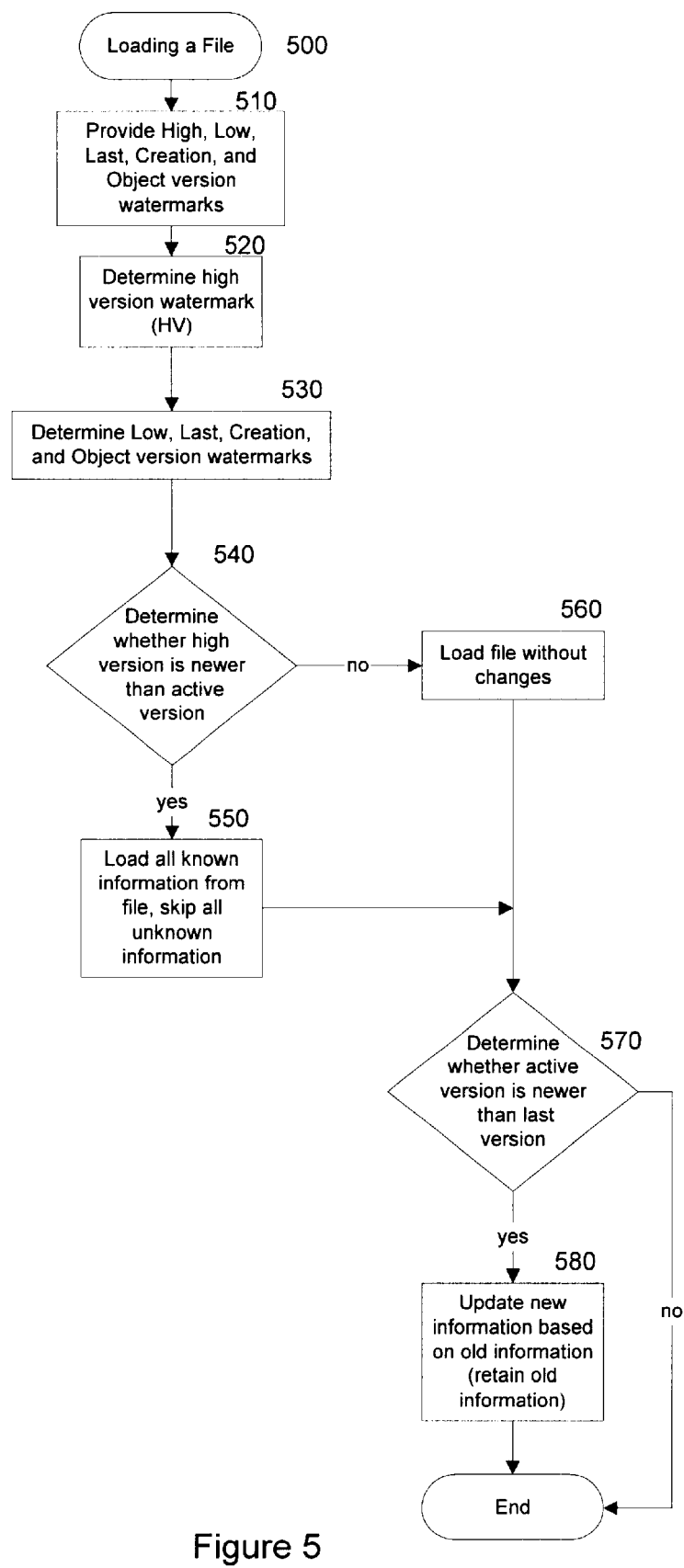
FIG. 5 is a flow chart depicting a method for loading an original data file according to an exemplary embodiment of the present invention.
Figure 6:
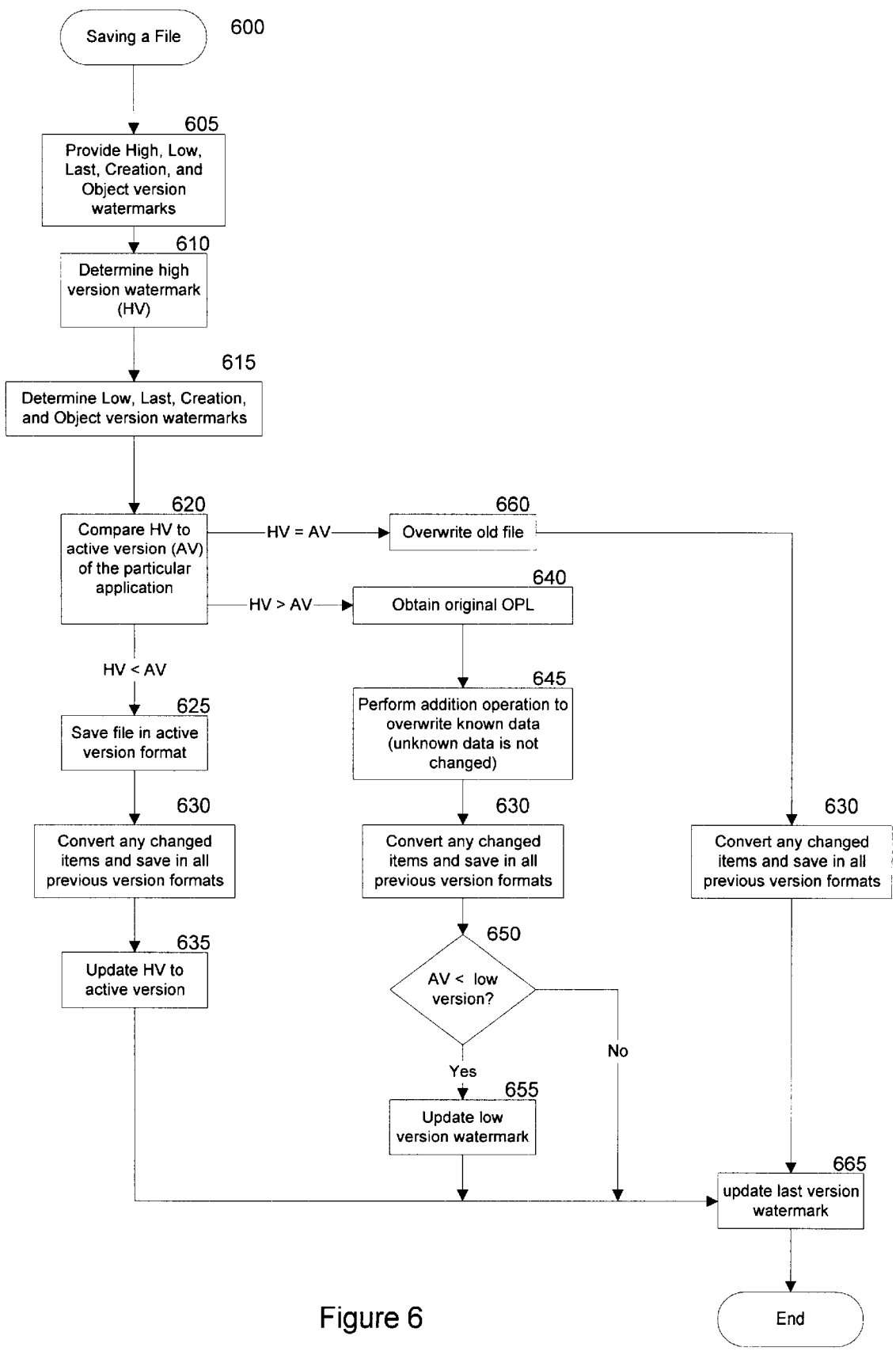
FIG. 6 is a flow chart depicting a method for saving an original data file according to an exemplary embodiment of the present invention.

Referring now to FIGS. 5 and 6, a method according to the present invention for providing compatibility between an active version, a previous version, and a later version of an application program will be described. The active version of the application program is an application program currently operating on computer system 200 (FIG. 2). The previous version of the application program is any version of the application program created before the active version. The later version of the application program is any version of the application program created after the active version. Typically, a version of an application program is designated by a number. For example, the first version of the application program can be designated as version 1.0. Later versions of the application program can be designated as higher numbers. For example, the second version can be designated as version 2.0. Version 1.0 is a previous version with respect to version 2.0. Version 2.0 is a later version with respect to version 1.0.

The present invention can be used with OPL arrays and conventional OPLs described above as the structure of the data file. However, as understood by those skilled in the art, the present invention is not limited to those file structures.

According to an exemplary embodiment of the present invention, file version watermarks can be provided in an original data file of an application program to indicate various properties of the original data file. The file version watermarks can be provided in the file header, which provides information about the file. A high version watermark can be provided to indicate the highest version of the application program used to save the file. A last version watermark can be provided to indicate the last version of the application program used to save the file. A low version watermark can be provided to indicate the lowest version of the application program used to save the file. A creation version watermark can be provided to indicate the version of the application program that first created the file. An object version watermark can be provided as a property on each object to indicate the highest version of the application program to write a particular object. Each file version watermark can indicate changes, additions, or deletions made to the file. When loading a file, the present invention can determine any data structures and properties that have been added or modified since the low watermark version. The added or modified items can then be corrected to be compatible with any version.

In operation, the high version watermark in the data file can be compared to the active version of the application program. By such comparison, it can be determined whether the original data file corresponds to the active version, a previous version, or a later version of the application program. Since the entire file can be saved by the application program, objects in the file include the characteristics of a file created by a version identified by the high version watermark. The application program can then determine how to load and/or save the original data file based on whether it corresponds to the active version, the previous version, or the later version. The original data file can comprise an object property list, an object property array, or other file structures.

For example, version 2.0 (the later version) of an application program can determine whether to convert information based on how version 2.0 treats the information differently from version 1.0 (the previous version). For instance, if version 1.0 had a tracking table for hyperlinks, but version 2.0 places the hyperlink data in the objects themselves, then version 2.0 can determine that it should convert that information when loading a file written by version 1.0. However, if version 2.0 was the oldest version to write the file, then version 2.0 can determine that such a conversion is not necessary.

The low and high version watermarks (and the object watermarks) can be updated if they exceed the previous mark. The last version to save the file can be updated on save. The creation version watermark can be provided when the file is originally created and is not typically updated.

Referring now to FIG. 5, a method 500 of loading a data file according to an exemplary embodiment of the present invention will be described. FIG. 5 is a flow chart depicting method 500 for loading an original data file in an application program so that the original data file is compatible with an active version, a previous version, and a later version. Method 500 can comprise step 510 of providing a high version watermark, a low version watermark, a last version watermark, a creation version watermark, and/or an object version watermark in an original data file. In step 520, the high version watermark in the original data file is determined. The method also can determine the low version watermark, the last version watermark, the creation version watermark, and/or the object version watermark of the objects in the original data file, as shown in step 530. In step 540, the high version watermark is compared to the active version of the application program to determine if the high version is newer than the active version. Based on that comparison, the method determines how to load the original data file.

If the comparison of step 540 indicates that the high version watermark represents a version of the application program that not newer than the active version, then the original data file corresponds to the same version or a previous version of the application program with respect to the active version. In that case, the method branches to step 560 where the original data file can be loaded into the application program without changes. Because the high version watermark corresponds to the same version or a previous version of the application program, the active version can read and understand all information in the original data file.

If the comparison of step 540 indicates that the high version watermark represents a version of the application program that is newer than the active version, then the original data file corresponds to a later version of the application program with respect to the active version. In that case, the method branches to step 550 to load the original data file. Because the high version watermark corresponds to a later version of the application program, the active version may not be able to read and understand all information in the original data file. Accordingly, the original data file is loaded in the application program in step 550 by loading all known information and skipping all unknown information. When an OPL or OPL array is used as the file structure, unknown properties of an OPL associated with an object can be maintained by loading all unknown properties and storing them in a memory block until the file is saved. Alternatively, the program can track a location of the original OPL associated with an object on the disk and can read the unknown properties of an OPL back into memory as needed before overwriting the file.

After step 550 or 560, the method proceeds to step 570 where it is determined whether the last version watermark in the original computer file represents a version of the application program that is older than the active version. If the determination in step 570 is negative, then the method ends. If the determination in step 570 is affirmative, then the method branches to step 580 where the original data file can be converted by updating new or modified information based on old information in the original data file. The old information can also be retained without any changes.

Steps 570 and 580 operate to convert the original data file based on the last version watermark. The last version watermark can indicate additional information from the high version watermark to determine what changes to the original data file are needed. For example, suppose that version 2 of the computer application program (the high version watermark) has written the original data file. Version 2 can include a new or modified property from Version 1. However, if version 1 of the application program was the last version to write the file (the last version watermark), then it may have changed some of the data that corresponds to the new or modified properties of version 2. Accordingly, if version 2 or a later version (the active version) reads the original data file, then that version may need to convert data in the data file because the last version to write the file was version 1 (data written by version 1 may need to be updated to correspond to version 2 or the later version).

The file version watermarks can be provided on an object by object basis instead of, or as well as, on the whole file. Method 500 (and method 600 discussed below) can then be applied to an object in the original data file. Providing file version watermarks for individual objects can optimize the loading and saving methods by determining which objects in the file need to be converted or ignored. Additionally, file version watermarks can be provided on a property by property basis instead of, or as well as, on the whole file or on a whole object. Method 500 (and method 600 discussed below) can then be applied to a property in the original data file. Providing file version watermarks for individual properties can optimize the loading and saving methods by determining which properties in the file need to be converted or ignored.

Furthermore, the active version of the application program can have an active version watermark associated with each object, which can represent the versions of the application program that have revised, changed, or deleted the object. In method 500 (and method 600 discussed below), the object version watermark for a particular object can be compared to the active version, where the active version is represented by the active version watermark for that particular object in the active version. Accordingly, the present invention can optimize the determination of whether the object in the original data file needs to be updated, because the object only needs to be updated if the active version watermark is newer than the object version watermark. For example, suppose that the object version watermark for a particular object in the original data file indicates that version 1.0 was the last version to save the particular object. If active version 2.0 loads the file, it will update information in the active version that is based on the particular object, because version 2.0 is newer than version 1.0. However, if an active version watermark is provided for that particular object in the active version, where the active version watermark indicates that the particular object has not changed since version 1.0, then the active version will not update the particular object, because it has not been changed in version 2.0. Thus, the loading method can be optimized by eliminating unnecessary conversion steps.

Referring now to FIG. 6, an exemplary embodiment of a method 600 for saving a data file according to the present invention will be described. Method 600 allows a modified data file to be saved so that it is compatible with an active version, a previous version, and a later version. After an original data file has been modified by the active version of the application program, the modified original data file can be saved to be compatible with the active version, previous versions, and later versions. FIG. 6 is a flow chart depicting method 600. Method 600 can comprise step 605 of providing a high version watermark, a low version watermark, a last version watermark, a creation version watermark, and/or an object version watermark in an original data file. In step 610, the high version watermark in the original data file is determined. Method 600 also can determine the low version watermark, the last version watermark, the creation version watermark, and/or the object version watermark of the original data file, as shown in step 615. In step 620, the high version watermark is compared to the active version of the application program. Based on that comparison, the method determines how to save the modified original data file.

If the comparison of step 620 indicates that the high version watermark represents a version of the application program that is older than the active version, then the original data file corresponds to a previous version of the application program with respect to the active version. In that case, the method branches to step 625 to save the modified original data file in the format of the active version of the application program. Because the high version watermark corresponds to a previous version of the application program, the active version of the application program also can save the modified original data file in a format compatible with all previous versions. Accordingly, the method proceeds to step 630 where items in the modified original data file are converted to the format of the previous version(s) and saved. Thus, the modified original data file is saved in the formats of both the active version and the previous version(s). Old information from the previous version can be reconstructed in step 630, allowing the file to be used by previous, active, and future versions of the application program. If reconstructing the old information becomes too large a task, then future files can be truncated by inserting a command in the file that states that the file can only be read by a certain version or future versions thereof. In step 635, the high version watermark of the original data file is updated to correspond to the active version of the application program. The method then proceeds to step 665 where the last version to save the file also is updated for future use.

If the comparison of step 620 indicates that the high version watermark represents a version of the application program that is newer than the active version, then the original data file corresponds to a later version of the application program with respect to the active version. In that case, the method branches to step 640 where the original data file is obtained. Then, in step 645, the original data file is overwritten with the modified original data file. Because the high version watermark corresponds to a later version of the application program, the modified original data file can contain information or data that is unknown to the active version. (For example, see step 580 in FIG. 5.) Accordingly, in step 645, only known data of the original data file is overwritten with data of the modified original data file. Unknown property data is not changed. By this method, the unknown data remains available for later versions of the application program that can read that data. The unknown data can be maintained by the application program as discussed above with reference to FIG. 5. The method then proceeds to step 630 where items in the modified original data file are converted to the format of the previous version(s) and saved. Thus, the modified original data file is saved in the formats of both the active version and the previous version(s).

Next, the method determines whether the low version watermark needs to be updated. In step 650, the active version of the application program is compared to the low version watermark of the original data file. If it is determined in step 650 that the active version is older than the version of the application program represented by the low version watermark, then the method branches to step 655 where the low version watermark is updated to correspond to the active version. The method then proceeds to step 665 where the last version to save the file is also updated for future use. If it is determined in step 650 that the active version is the same as or newer than the version of the application program represented by the low version watermark, then the method branches directly to step 665 where the last version watermark is updated to correspond to the active version.

If the comparison of step 620 indicates that the high version watermark represents a version of the application program that is the same as the active version, then the original data file corresponds to the active version of the application program. In that case, the method branches to step 660 where the modified original data file is saved by overwriting the original data file. The method then proceeds to step 630 where items in the modified original data file are converted to the format of the previous version(s) and saved. Thus, the modified original data file is saved in the formats of both the active version and the previous version(s). The method then proceeds to step 665 where the last version to save the file is updated for future use.

Note that step 630 can be performed regardless of the branch taken from step 620. Accordingly, properties corresponding to previous versions can always be written to the file so that that file is compatible with previous versions.

In some cases, methods 500 and 600 can comprise an additional step (not shown) of tracking the location of OPL array elements to save the file after it has been modified. For example, a version of a data file may comprise a table having four elements. However, the modified version of the data file may have only three elements. When the application program attempts to overwrite the original data file, the disk version includes the original four elements, but the memory version includes only three elements. Without the tracking step, the application program may not know which element has been deleted. In the tracking step, the application program tracks the original index of all tables. When a table is read from disk, an extra data item indicating the position of each element in the table is added. In other words, the application program marks which element was first, second, etc. Accordingly, the program determines which element has been deleted because it does not exist and can preserve future version properties that might exist in the array elements.

In methods 500 and 600, the active version of the application program can use any of the watermarks to determine what actions to take when loading the original data file. Use of the high version watermark has been discussed above. The low version watermark can give a hint to the application program and limits the types of conversion necessary on the original data file. Building on a previous example, if the hyperlink table in version 1.0 is known not to exist, because the low version watermark indicates the file has never been written by that version, the conversion process can safely skip anything that deals with the hyperlink table. The last version watermark can indicate data that is known by the last version to write the file, as well as data that is unknown but carried in the file.

The object version watermark can provide specific information for a particular object, whereby the particular object can be loaded, saved, or converted based on that information. The object version watermark can provide information for the particular object and can indicate the highest file version of any property that a specific object contains. As an example, suppose that a hyperlink property was added to object X in version 2.0, and no new properties were added to object X in version 3.0. If object X contains a hyperlink written in version 2.0 or a later version, it's version watermark would be set to version 2.0. If object X does not contain a hyperlink (and therefore no hyperlink property is written) or was written by version 1.0, the version watermark would be set to version 1.0. This information can be used to further optimize loading and saving operations with respect to each individual object and the highest version that would understand all properties in that object. For example, object X that was written by version 3.0 and did not contain a hyperlink (and would therefore have a version 1.0 object watermark) could be written and read by version 1.0 without being concerned about future version properties existing, even though the file high version watermark would reflect version 3.0.

Generally, the most current version of the application program to save a file is best suited to determine how to handle any information from that version or previous versions. The most current version can read and understand everything in the file. The most current version of the application program determines which information to keep, convert, or discard. Accordingly, the highest version to write a file determines whether information is discarded or converted. All lower versions can simply propagate any unknown information.

Finally, all steps of methods 500 and 600 shown in FIGS. 5 and 6 are not required for the invention to be operable. Additionally, some steps may be performed in a different order than illustrated.

Figure 9:
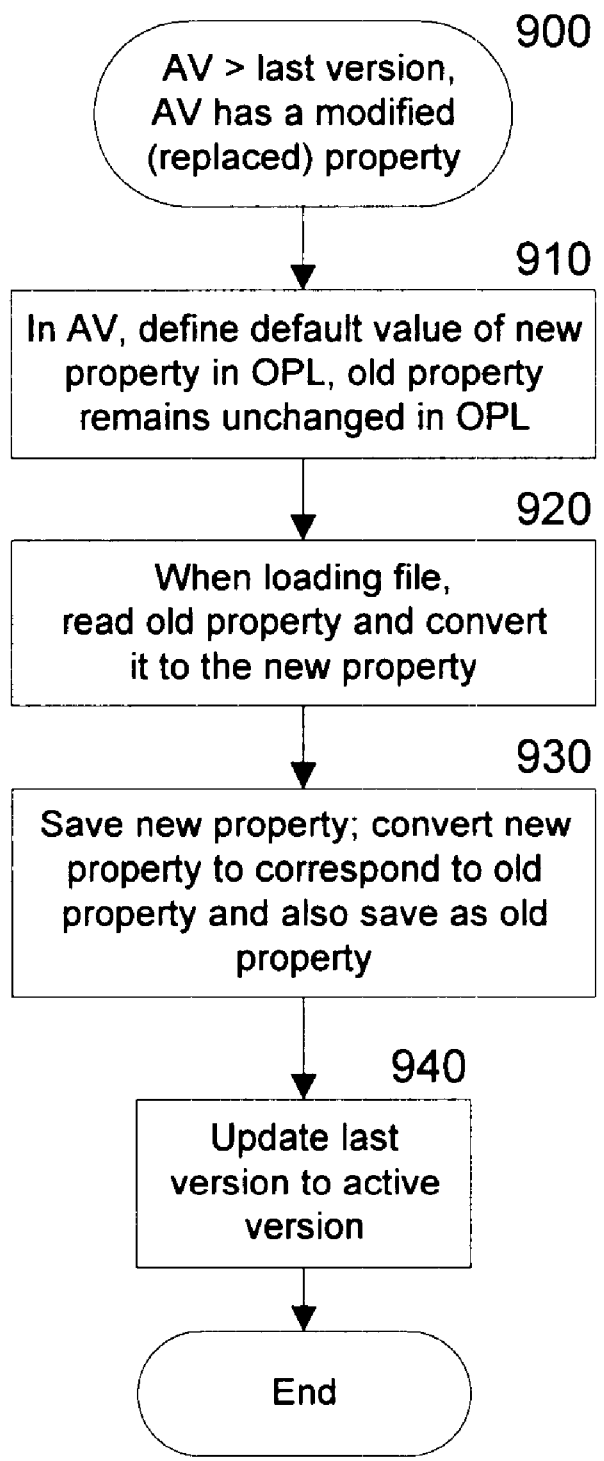
FIG. 9 is a flow chart depicting a method for loading and saving an original data file according to the present invention, where the active version has modified an old object property of a previous version.

With reference to FIGS. 7–9, specific exemplary embodiments of methods 500 and 600 according to the present invention will be described. In each of FIGS. 7–9, method 500 or 600 has determined that the last version watermark is less than the active version of the application program (i.e., that the last version of the application program to save the original data file corresponds to a previous version of the application program with respect to the active version) (see step 595 of FIG. 5). Additionally, the embodiments described below with reference to FIGS. 7–9 are also operable when method 500 or 600 has determined that the high version watermark is less than the active version of the application program.

FIG. 7 is a flow chart depicting a method 700 for loading and saving an original data file according to the present invention, where the active version has an additional object property that is not included in a previous version. In step 710 of method 700, a default value for a new property is defined in an OPL for the active version of the application program. The process proceeds to step 725 where the original data file is loaded without changes. After the original data file has been modified, it is saved in step 730. Accordingly, the new property is saved for use with the active and future versions of the application program. Previous versions will simply ignore the new property. In step 740, the high version watermark is updated to the active version.

FIG. 8 is a flow chart depicting a method 800 for loading and saving an original data file according to the present invention, where the active version has deleted an object property that was used in a previous version. In step 820, the deleted property is ignored when the original data file is loaded in the active version. When a modified version of the original data file is saved in step 830, the file is saved with the deleted property available to older versions. While the active version did not use the deleted property, the deleted property is returned to the saved file for use by previous versions. The deleted property can be returned to the saved file by leaving the deleted property in the original data file, i.e., by not writing the deleted property out of the file. Alternatively, the deleted property can be returned to the saved file by propagating the deleted property (from the original data file) back into the saved file. Because the deleted property is known to the active version, the value of the deleted property can be derived from other property values, or a default value representing the deleted property can be generated, to allow the deleted property to be returned to the file. In step 840, the high version watermark can be updated to the active version.

For example, suppose that the previous version included a drop shadow property on an object. The active version may no longer support this property, i.e., the drop shadow property has been deleted from the active version. The newer version of the application program recognizes that the drop shadow property has been deleted. However, the drop shadow property can still be written to the file by the active version. In step 820, the original data file can be loaded, and the deleted drop shadow property can be ignored. When a modified version of the original data file is saved in step 830, the file can be saved with the deleted drop shadow property available to older versions. While the active version did not use the deleted drop shadow property, the deleted drop shadow property can be returned to the saved file for use by previous versions. The drop shadow property value can be determined from the value of other properties, or a default value can be used. In step 840, the high version watermark can be updated to the active version.

FIG. 9 is a flow chart depicting a method 900 for loading and saving an original data file according to the present invention, where the active version has modified an old object property of a previous version. Rather than replacing the old property with the modified property, a new property that represents the modified property is provided in the active version. In step 910 of method 900, a default value for a new property is defined in an OPL of the active version of the application program. The old property is left unchanged. Then in step 920, the original data file is loaded into the active version, and the old property is converted to the new (modified) property. After the original data file has been modified, it is saved in step 930. In step 930, the new property is saved without reference to the old property. Additionally in step 930, the new property is converted to the old property and saved for use by a previous version. In step 940, the high version watermark is updated to the active version.

For example, suppose that the previous version of the application program used the RGB (Red, Green, Blue) color model to define colors of objects. The active version of the application program could include a new property to allow defining the colors of objects in the CMYK color model (Cyan, Magenta, Yellow, Black) used by professional printers. The new CMYK color property can be based on the old RGB color property, and an equivalent CMYK value can be determined for each RGB value. A new opyid can be added to the appropriate OPL dictionary. For example, the appropriate dictionary can be a page object dictionary for a page object, another existing dictionary, or a new dictionary. In step 910, the default value for the new CMYK color property can be defined in the OPL dictionary. The old RGB property remains unchanged. In step 920, the original data file can be loaded into the active version, and the new CMYK color property can be updated based on the old RGB property of the object. After the original data file has been modified, it can be saved in step 930. In step 930, the new CMYK color property can be saved without reference to the old RGB property from the original data file. The new CMYK property can be converted to a corresponding old RGB property and saved in the file. Accordingly, the new CMYK color property can be saved for use with the active and future versions of the application program. Previous versions will simply ignore the new CMYK color property. In step 940, the high version watermark can be updated to the active version.

The method of the present invention can also resolve inconsistencies between two versions of the application program that are saved in the data file. In the CMYK-RGB example discussed above, previous versions can read the file because the later version will convert the new CMYK color property down to a corresponding RGB property. However, inconsistencies can develop when the last version to write the file is older than both the active version and the high version to write the file. The active version can be the same version or a later version than the high version to write the file. If the high version, which is not the last version, to write the file recognized the new CMYK color property, then it will write out the new CMYK color property value into the data file, as well as a corresponding RGB color property value. Additionally, if the last version to write the file recognized only the RGB color property, then it will write out the RGB color property value into the data file. When the data file is loaded into the active version that supports the new CMYK color property, the CMYK color property in the data file corresponds to old information. Two versions of the color property information exist in the data file because the high version wrote the CMYK color property value in the file and the last version wrote RGB color property value in the file. The RGB and CMYK values do not match because the last version to write the file updated the RGB value, but retained the value of the unknown CMYK property. When the file is loaded into the active version, the last version to write the file can be determined (see step 570 of FIG. 5). Based on that information, it can be determined that the CMYK color property value is outdated and that the RGB color property value should be loaded and converted to an updated CMYK color property value.

An object is a collection of properties. Accordingly, changes to an object in different versions of the application program can be reflected by changes in properties that correspond to the object. When the data file containing the object is loaded or saved, the steps of methods 700, 800, and 900 can be reiterated for individual properties of the object.

An embodiment of the present invention can be used as part of a document publishing system known as the Microsoft® Publisher, which is available from Microsoft® Corporation of Redmond, Wash. That publishing system can allow a user to edit documents and insert various objects containing graphics data, text data, spreadsheet data, or other kinds of data. In addition, that system can allow the user to modify the properties of the objects. The system can have a number of predefined object types that have predefined properties which are set to standard values (default values). Each object type can have a different set of properties and/or property values. Each object can be an instance of their object type. As such, the settings of an object in its original form can be readily obtainable. Although an embodiment is described with reference to a document publishing system, one skilled in the art will recognize that the techniques described herein can be applied to a virtually unlimited number of other types of systems.

The present invention can be used with computer hardware and software that performs the processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, may be made by those skilled in the art without departing from the spirit and scope of the present invention defined in the following claims, the scope of which is to be accorded the broadest interpretation so as to encompass such modifications and equivalent structures.

What is claimed is:

1. A method for reading an original data file to be compatible with an active version and a later version of an application program, said method comprising the steps of:

providing a high version watermark in the original data file, the high version watermark indicating a highest version of the application program used to save the file;

comparing the high version watermark to the active version of the application program to determine whether the original data file corresponds to the later version of the application program; and loading the original data file into the active version, wherein, when said comparing step determines that the original data file corresponds to the later version, said loading step comprises the steps of:

ignoring unknown information in the original data file; and loading known information from the original data file into the active version.

2. A method according to claim 1, wherein said original data file comprises an object property list.

3. A method according to claim 2, wherein said object property list contains an object property list array.

4. A method according to claim 3, further comprising the steps of:

tracking a position of objects in the object property list array; and updating the object property list array based on the position of the objects tracked in said tracking step.

5. A method according to claim 1, wherein the unknown and known information each comprise a property of an object property list.

6. A method according to claim 1, further comprising the step of saving a modified version of the original data file, said saving step comprising the steps of:

overwriting the known information from the original data file with information from the modified version; and retaining the unknown information from the original data file to keep the unknown information available to the later version.

7. A method according to claim 1, further comprising the steps of:

providing a last version watermark in the original data file, the last version watermark indicating a last version of the application program used to save the file; and determining characteristics of the original data file by comparing the last version watermark to the active version of the application program.

8. A method according to claim 7, wherein, when said determining step determines that the last version watermark corresponds to a version of the application program that is previous to the active version, said method further comprises the step of converting information in the active version of the application program based on information in the original data file.

9. A method according to claim 1, further comprising the steps of:

providing a low version watermark in the original data file, the low version watermark indicating a lowest version of the application program used to save the file;

determining characteristics of the original data file by comparing the low version watermark to the active version of the application program.

10. A method according to claim 1, further comprising the steps of:

providing an object version watermark for an object in the original data file, the object version watermark indicating a lowest version of the application program that can interpret all properties in the object; and determining characteristics of the original data file by comparing the object version watermark to an object version in the active version of the application program.

11. A computer-readable medium having computer-executable instructions for performing the method of claim 1.

12. A method for reading an original data file to be compatible with an active version and a previous version of an application program, said method comprising the steps of:

providing a high version watermark in the original data file, the high version watermark indicating a highest version of the application program used to save the file;

comparing the high version watermark to the active version of the application program to determine whether the original data file corresponds to the previous version of the application program; and loading the original data file without changes into the active version, when said comparing step determines that the original data file corresponds to the previous version.

13. A method according to claim 12, further comprising the steps of:

providing a last version watermark in the original data file, the last version watermark indicating a last version of the application program used to save the file; and determining characteristics of the original data file by comparing the last version watermark to the active version of the application program.

14. A method according to claim 13, wherein, when said determining step determines that the last version watermark corresponds to a version of the application program that is previous to the active version, said method further comprises the step of converting information in the active version of the application program based on information in the original data file.

15. A method according to claim 14, further comprising the steps of:

saving the information converted in said converting step; and saving the unconverted old information from the original data file.

16. A method according to claim 14, further comprising the steps of:

saving the information converted in said converting step;

generating information that corresponds to the old information from the original data file; and saving the information generated in said generating step.

17. A method according to claim 12, wherein said original data file comprises an object property list.

18. A method according to claim 17, wherein said object property list comprises an object property list array.

19. A method according to claim 18, further comprising the steps of:

tracking a position of objects in the object property list array; and updating the object property list array based on the position of the objects tracked in said tracking step.

20. A computer-readable medium having computer-executable instructions for performing the method of claim 12.

21. A method for reading an original data file to be compatible with an active version and a previous version of an application program, said method comprising the steps of:

providing a last version watermark in the original data file, the last version watermark indicating a last version of the application program used to save the file;

comparing the last version watermark to the active version of the application program to determine whether the original data file corresponds to the previous version of the application program; and loading the original data file into the active version, wherein, when said comparing step determines that the original data file corresponds to the previous version, said loading step comprises the steps of:

determining whether the previous version includes a deleted item that has been deleted from the active version;

ignoring old information in the original data file corresponding to the deleted item when said determining step determines that the previous version includes the deleted item; and loading information from the original data file that corresponds to an item other than the deleted item.

22. A method according to claim 21, wherein the deleted item comprises an object property.

23. A method according to claim 21, wherein the deleted item comprises an object.

24. A method according to claim 21, further comprising the steps of:

saving a modified version of the original data file; and saving information corresponding to the deleted item of the original data file.

25. A method according to claim 21, further comprising the steps of:
saving a modified version of the original data file;
generating information that corresponds to the deleted item from the original data file; and
saving the information generated in said generating step.

26. A computer-readable medium having computer-executable instructions for performing the method of claim 21.

27. A method for reading an original data file to be compatible with an active version and a previous version of an application program, said method comprising the steps of:
providing a last version watermark in the original data file, the last version watermark indicating a last version of the application program used to save the file;
comparing the last version watermark to the active version of the application program to determine whether the original data file corresponds to the previous version of the application program; and
loading the original data file into the active version,
wherein, when said comparing step determines that the original data file corresponds to the previous version, said loading step comprises the steps of:
determining whether the active version includes a modified item related to old information in the original data file;
converting the old information from the original data file to information corresponding to the modified item when said determining step determines that the active version includes the modified item related to the old information in the original data file; and
loading the information converted in said converting step into the active version.

28. A method according to claim 27, wherein the modified item comprises an object property.

29. A method according to claim 27, wherein the modified item comprises an object.

30. A method according to claim 27, further comprising the step of saving a modified version of the original data file, said saving step comprising the steps of:
saving the information corresponding to the modified item;
converting, in a second converting step, the information corresponding to the modified item to information corresponding to the old information and readable by the previous version; and
saving the converted information from said second converting step.

31. A computer-readable medium having computer-executable instructions for performing the method of claim 27.

32. A method for reading an original data file to be compatible with an active version, a previous version, and a later version of an application program, said method comprising the steps of:
providing a high version watermark in the original data file, the high version watermark indicating a highest version of the application program used to save the file;
providing a last version watermark in the original data file, the last version watermark indicating a last version of the application program used to save the file;
comparing the high version watermark to the active version of the application program to determine whether the original data file contains properties corresponding to one of the previous version, the active version, and the later version of the application program;
comparing the last version watermark to the active version of the application program to determine whether the original data file contains additional properties corresponding to one of the previous version, the active version, and the later version of the application program; and
loading the original data file into the active version,
wherein, when said comparing steps determine that the original data file contains properties corresponding to different versions of the application program, said loading step comprises the steps of:
determining which properties of the original data file are current and which properties of the original data file are outdated;
loading the original data file into the active version based on the current properties determined in said determining step; and
ignoring the outdated properties determined in said determining step.

33. A method for reading an original data file to be compatible with an active version, a previous version, and a later version of an application program, said method comprising the steps of:
providing a last version watermark in the original data file, the last version watermark indicating a last version of the application program used to save the file;
comparing the last version watermark to the active version of the application program to determine whether the last version used to save the original data file corresponds to a previous version of the application program;
converting information in the active version of the application program based on information in the original data file, when said comparing step determines that the last version used to save the original data file corresponds to a previous version; and
loading the information converted in said converting step.

34. A method for reading an original data file to be compatible with an active version and a later version of an application program, where the original data file comprises an object property list, said method comprising the steps of:
providing an object version watermark for an object in the object property list of the original data file, the object version watermark indicating a lowest version of the application program that can interpret all properties contained in the object;
comparing the object version watermark of the object to an object version in the active version of the application program to determine whether the object corresponds to the later version of the application program; and
loading the original data file into the active version,
wherein, when said comparing step determines that the object corresponds to the later version, said loading step comprises the steps of:
ignoring unknown information corresponding to the object in the original data file; and
loading known information corresponding to the object in the original data file into the active version.

35. A method according to claim 34, wherein the object property list contains an object property list array.

36. A method according to claim 35, further comprising the steps of:
   tracking a position of objects in the object property list array; and
   updating the object property list array based on the position of the objects tracked in said tracking step.

37. A method according to claim 34, wherein the unknown and known information each comprise a property of the object property list.

38. A method according to claim 34, further comprising the step of saving a modified version of the original data file, said saving step comprising the steps of:
   overwriting the known information corresponding to the object in the object property list of the original data file with information from the modified version; and
   retaining the unknown information corresponding to the object in the object property list of the original data file to keep the unknown information available to the later version.

39. A method according to claim 34, further comprising the steps of:
   providing a last version object watermark in the original data file, the last version object watermark indicating a last version of the application program used to write the object; and
   determining characteristics of the object in the original data file by comparing the last version object watermark to the active version of the application program.

40. A method according to claim 39, wherein, when said determining step determines that the last version object watermark corresponds to a version of the application program that is previous to the active version, said method further comprises the step of converting information in the active version of the application program based on information corresponding to the object in the original data file.

41. A method according to claim 40, further comprising the steps of:
   updating the object property list to include the information converted in said converting step; and
   retaining the old information in the object property list.

42. A computer-readable medium having computer-executable instructions for performing the method of claim 34.

43. A method for reading an original data file to be compatible with an active version and a previous version of an application program, wherein the original data file comprises an object property list, said method comprising the steps of:
   providing an object version watermark for an object in the object property list of the original data file, the object version watermark indicating a lowest version of the application program that can interpret all properties contained in the object;
   comparing the object version watermark of the object to an object version in the active version of the application program to determine whether the object in the original data file corresponds to the previous version of the application program; and
   loading the original data file into the active version,
   wherein, when said comparing step determines that the object in the original data file corresponds to the previous version, said loading step comprises the steps of:
      converting old information corresponding to the object in the original data file to a format of the active version; and
      loading the information converted in said converting step into the active version.

44. A method according to claim 43, wherein the object property list comprises an object property list array.

45. A method according to claim 44, further comprising the steps of:
   tracking a position of objects in the object property list array; and
   updating the object property list array based on the position of the objects tracked in said tracking step.

46. A method according to claim 43, further comprising the steps of:
   saving the information converted in said converting step; and
   saving the unconverted old information from the original data file.

47. A method according to claim 43, further comprising the steps of:
   saving the information converted in said converting step;
   generating information that corresponds to the old information from the original data file; and
   saving the information generated in said generating step.

48. A computer-readable medium having computer-executable instructions for performing the method of claim 43.

49. A method for reading an original data file to be compatible with an active version and a previous version of an application program, wherein the original data file comprises an object property list, said method comprising the steps of:
   providing an object version watermark for an object in the object property list of the original data file, the object version watermark indicating a lowest version of the application program that can interpret all properties contained in the object;
   comparing the object version watermark to an object version in the active version of the application program to determine whether the object in the original data file corresponds to the previous version of the application program; and
   loading the original data file into the active version,
   wherein, when said comparing step determines that the object in the original data file corresponds to the previous version, said loading step comprises the steps of:
      determining whether the previous version includes a deleted item that has been deleted from the active version;
      ignoring old information in the original data file corresponding to the deleted item when said determining step determines that the previous version includes the deleted item; and
      loading information from the original data file that corresponds to an item other than the deleted item.

50. A method according to claim 49, wherein the deleted item comprises an object property.

51. A method according to claim 49, wherein the deleted item comprises an object.

52. A method according to claim 49, further comprising the steps of:
   saving a modified version of the original data file; and
   saving information corresponding to the deleted item of the original data file.

53. A method according to claim 52, wherein the information corresponding to the deleted item of the original data file comprises one of information derived from default values and information based on other properties in the active version.

54. A computer-readable medium having computer-executable instructions for performing the method of claim 49.

55. A method for reading an original data file to be compatible with an active version and a previous version of an application program, wherein the original data file comprises an object property list, said method comprising the steps of:

providing an object version watermark for an object in the object property list of the original data file, the object version watermark indicating a lowest version of the application program that can interpret all properties contained in the object;

comparing the object version watermark to the object version in the active version of the application program to determine whether the object in the original data file corresponds to the previous version of the application program; and loading the original data file into the active version, wherein, when said comparing step determines that the object in the original data file corresponds to the previous version, said loading step comprises the steps of:

determining whether the active version includes a modified item related to old information in the original data file;

converting the old information from the original data file to information corresponding to the modified item, when said determining step determines that the active version includes the modified item related to the old information in the original data file; and loading the information converted in said converting step into the active version.

56. A method according to claim 55, wherein the modified item comprises an object property.

57. A method according to claim 55, wherein the modified item comprises an object.

58. A method according to claim 55, further comprising the step of saving a modified version of the original data file, said saving step comprising the steps of:

saving the information corresponding to the modified item;

converting, in a second converting step, the information corresponding to the modified item to information corresponding to the old information and readable by the previous version; and saving the converted information from said second converting step.

59. A computer-readable medium having computer-executable instructions for performing the method of claim 55.

60. A data file that is readable by an active version of an application program and by a later version of the application program, comprising:

an object;

an object property list array having at least one known property associated with the object, the known property being known to the active version, and having at least one unknown property associated with the object, the unknown property being unknown to the active version; and an object version watermark indicating a lowest version of the application program that can interpret all properties contained in the object, wherein the active version of the application program is operative to compare the object version watermark to a version number associated with the active version and to ignore the unknown property in response to a determination that the object version watermark is greater than the version number associated with the active version.

61. A data file that is readable by an active version of an application program and by a previous version of the application program, comprising:

an object;

an object property list array having at least one property associated with the object and corresponding to the previous version; and an object version watermark indicating a lowest version of the application program that can interpret all properties contained in the object, wherein the active version of the application program is operative to compare the object version watermark to a version number associated with the active version and to update another property associated with the object and corresponding to the active version based on a property of the at least one property in the data file, in response to a determination that the object version watermark is less than the version number associated with the active version.

* * * * *